United States Patent
Chen

(10) Patent No.: US 9,817,259 B2
(45) Date of Patent: Nov. 14, 2017

(54) MULTI-SCREEN DISPLAY DEVICE

(71) Applicant: Shenzhen China Star Optoelectronics Technology Co., Ltd., Shenzhen, Guangdong (CN)

(72) Inventor: Lixuan Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 305 days.

(21) Appl. No.: 14/423,108

(22) PCT Filed: Jan. 15, 2015

(86) PCT No.: PCT/CN2015/070750
§ 371 (c)(1),
(2) Date: Feb. 20, 2015

(87) PCT Pub. No.: WO2016/090728
PCT Pub. Date: Jun. 16, 2016

(65) Prior Publication Data
US 2016/0342012 A1    Nov. 24, 2016

(30) Foreign Application Priority Data
Dec. 11, 2014    (CN) .......................... 2014 1 0765283

(51) Int. Cl.
*G02F 1/133*    (2006.01)
*G02F 1/1333*    (2006.01)

(52) U.S. Cl.
CPC .... *G02F 1/133308* (2013.01); *G02F 1/13336* (2013.01); *G02F 2001/13332* (2013.01);
(Continued)

(58) Field of Classification Search
CPC ........... G02F 1/133308; G02F 1/13336; G02F 2001/133314
(Continued)

(56) References Cited

U.S. PATENT DOCUMENTS 4,950,072 A * 8/1990 Honda ................. G03B 21/132
                                                      349/161
6,332,537 B1 * 12/2001 Usui ..................... B65D 5/321
                                                      206/521
(Continued)

FOREIGN PATENT DOCUMENTS

CN    201374154 Y    12/2009
CN    103295481 A    9/2013

OTHER PUBLICATIONS

Office Action, China Patent Office.

*Primary Examiner* — Lucy Chien
(74) *Attorney, Agent, or Firm* — Andrew C. Cheng

(57) ABSTRACT

The present invention discloses a multi-screen display device, which comprises a plurality of first liquid crystal displays and a plurality of second liquid crystal displays, wherein said plurality of first liquid crystal displays are arranged at intervals, said plurality of second liquid crystal displays are disposed on the frame of two corresponding and adjacent first liquid crystal displays. The multi-screen display device disclosed by the present invention can greatly decrease the display gap between two adjacent liquid crystal displays, improving the display area and the display effect, enhancing the end user's viewing experience.

14 Claims, 1 Drawing Sheet

(52) U.S. Cl.
CPC ............ *G02F 2001/133314* (2013.01); *G02F 2001/133317* (2013.01); *G02F 2001/133322* (2013.01); *G02F 2201/46* (2013.01); *G02F 2201/50* (2013.01); *G02F 2202/28* (2013.01)

(58) Field of Classification Search
USPC .......................................................... 349/73
See application file for complete search history.

(56) References Cited

U.S. PATENT DOCUMENTS

| | | | |
|---|---|---|---|
| 2006/0012951 A1* | 1/2006 | Kim ..................... | G06F 1/1641 361/679.04 |
| 2006/0152648 A1* | 7/2006 | Kim .................. | G02F 1/133308 349/58 |
| 2011/0157889 A1* | 6/2011 | Chang .................. | G02B 5/0215 362/235 |

* cited by examiner

MULTI-SCREEN DISPLAY DEVICE

BACKGROUND OF THE INVENTION

1. Field of the Invention

The present invention relates to a display splicing technical field; specifically, in particular to a multi-screen display device which is spliced together by a plurality of liquid crystal displays.

2. The Related Arts

Along with the evolution of optoelectronic and semiconductor technology, the flat panel display flourishes; however, in many flat panel displays, liquid crystal display, LCD, has been utilized for all aspects of production and life because of many superior characteristics such as high space utilization efficiency, low power consumption, no radiation, and low electromagnetic interference.

However, the size of the prior liquid crystal display is limited, in the occasion of requiring large-screen display such as the scene of advertising display in the busiest section, it may need a plurality of liquid crystal displays spliced together to meet the requirement of large screen.

The prior splicing method of the liquid crystal display is to compose a plurality of independent liquid crystal displays to a large screen through stacked arrangement. As shown in FIG. 1, each independent liquid crystal display has its own frame (wherein the width of the frame is B), and the adjacent two independent liquid crystal display exist gap (wherein the width of the gap is A) during the splicing process, it results the display fault of the large screen which is composed by the independent liquid crystal displays, there is no image in the display fault, the visual image is splitting, the display effect is poor.

SUMMARY OF THE INVENTION

In order to solve the issues of the prior art as described above, the purpose of the present invention is to provide a multi-screen display device, which comprises a plurality of first liquid crystal displays and a plurality of second liquid crystal displays, wherein said plurality of first liquid crystal displays are arranged at intervals, said plurality of second liquid crystal displays are disposed on the frame of two corresponding and adjacent first liquid crystal displays.

Furthermore, the second liquid crystal display comprises a correspondingly disposed liquid crystal display panel and a backlight module, wherein the liquid crystal display panel is disposed on the frame of two corresponding and adjacent first liquid crystal displays, the backlight module is disposed between two corresponding and adjacent first liquid crystal displays.

Furthermore, the frame of two corresponding and adjacent first liquid crystal display is provided with a mounting groove, the liquid crystal display panel is permanently installed on the mounting groove.

Furthermore, the liquid crystal display panel is permanently installed on the mounting groove through the pasting way.

Furthermore, the liquid crystal display panel is permanently installed on the mounting groove by using double-sided adhesive.

Furthermore, the multi-screen display panel also comprises a supporting plate which is disposed under the first liquid crystal display and the second liquid crystal display, it is used to support the first liquid crystal display and the backlight module.

Furthermore, the multi-screen display device also comprises a protective case which is disposed on the top of the first liquid crystal display and the second liquid crystal display.

Furthermore, the protective case comprises a case and hooks which are respectively disposed on both sides of the case, the case being opposite to the first liquid crystal display and the second liquid crystal display, the frames on both sides of the multi-screen display device being provided with slots, the hook being engaged and connected with the corresponding slot in order to fix the protective case.

Furthermore, the protective case comprises a case and connected bodies which are respectively disposed on both sides of the case, the connected body being fixedly connected with the frame of the multi-screen display device through the screw hole counterpoint.

Furthermore, the material of the protective case is transparent glass.

The multi-screen display device disclosed by the present invention can greatly decrease the display gap between two adjacent liquid crystal displays, improving the display area and the display effect, enhancing the end user's viewing experience.

BRIEF DESCRIPTION OF THE DRAWINGS

The above description and other aspects, features and advantages of embodiments of the present invention will be more clearly through combining the drawings to describe, in the drawings.

DETAILED DESCRIPTION OF THE PREFERRED EMBODIMENTS

Figure 1:
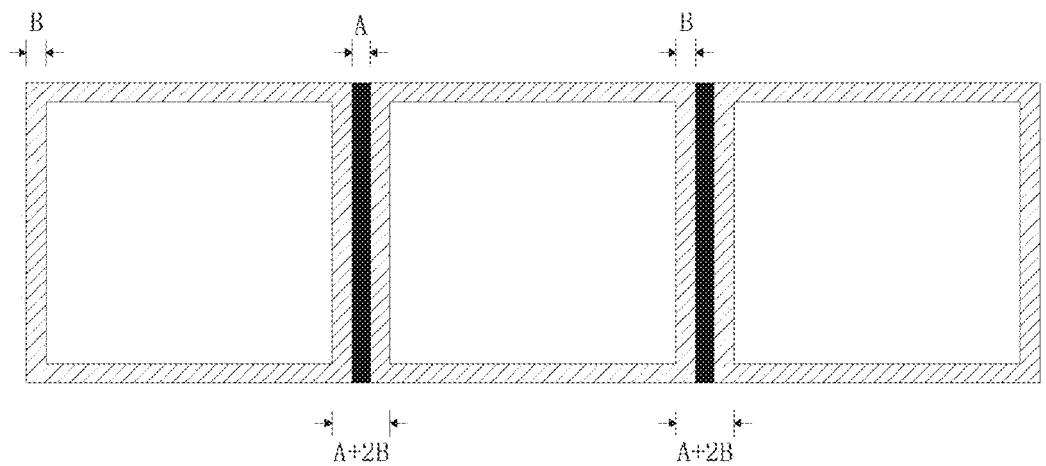
FIG. 1 is a structure diagram of a conventional spliced liquid crystal display.

The following will describe the embodiments of the present invention in detail refer to the drawings. However, there are many ways to embody the present invention, the present invention is not used to limit the mentioned embodiments. On the contrary, these embodiments are provided for explaining the theory and the application of the present invention, thereby making the other technical personnel in the prior art able to understand the various embodiments of the present invention and the various modifications suited to the particular intended application. In the drawings, the same label will be used to represent the same component.

Figure 2:
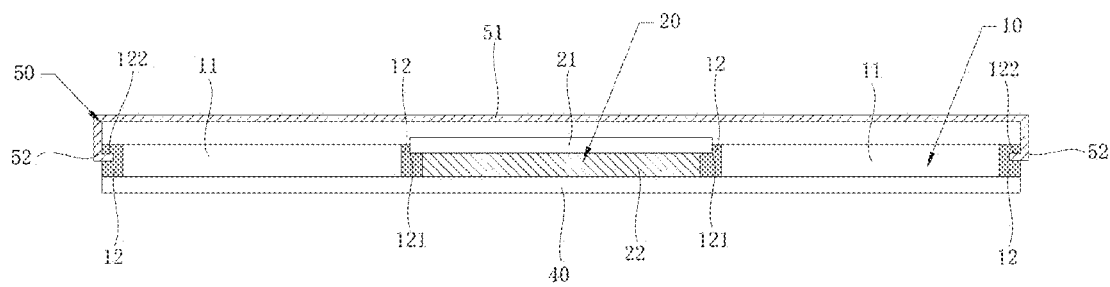
FIG. 2 is a structure diagram of a multi-screen display device according to the first embodiment of the present invention.

FIG. 2 is a structure diagram of a multi-screen display device according to the first embodiment of the present invention.

Refer to FIG. 2, the multi-screen display device according to the first embodiment of the present invention comprises two first liquid crystal displays 10 and one second liquid crystal display 20 which are placed on two planes. It should be realized that the quantity of the first liquid crystal display 10 and the quantity of the second liquid crystal display 20 in the present invention are not limited as shown in FIG. 1, those could be any number.

Each first liquid crystal display 10 comprises a display region 11 and frames 12 provided on both side of the display region 11, three first liquid crystal display 10 are arranged at intervals, the second liquid crystal display 20 is disposed on the frames 12 of two first liquid crystal displays 10. So that the second liquid crystal display 20 uses the frames 12 of two first liquid crystal display as its own use, thus between the display region (not shown) of the second liquid crystal display 20 and the adjacent first liquid crystal display only has the width of a frame 12, comparing to the interval width A+2B between two adjacent independent liquid crystal displays in the prior art as shown in FIG. 1, greatly decreasing the display gap between two adjacent liquid crystal display, improving the display area and the display effect, enhancing the end user's viewing experience.

Specifically, the second liquid crystal display 20 comprises a correspondingly disposed liquid crystal display panel 21 and a backlight module 22, wherein the liquid crystal display panel 21 is disposed on the frame 12 of two first liquid crystal displays 10, the backlight module 22 is disposed between two first liquid crystal displays 10.

In order to fixedly mount the liquid crystal display panel 21 of the second liquid crystal display 20, the frame 12 of the first liquid crystal display 10 where is mounted the liquid crystal display panel 21 is disposed a mounting groove 121, the liquid crystal display panel 21 is fixedly mounted in the mounting groove 12. In the first embodiment of the present invention, preferably, the liquid crystal display panel 21 is permanently installed on the mounting groove 121 by using double-sided adhesive, but the present invention is not limited in this, there is the other way to be permanently installed on the mounting groove 121.

In order to support the first liquid crystal display 10 and the second liquid crystal display 20, the multi-screen display device according to the first embodiment of the present invention also comprises a supporting plate 40, wherein the supporting plate 40 is disposed under the first liquid crystal display 10 and the second liquid crystal display 20; namely, the backlight modules 22 of the first liquid crystal display 10 and the second liquid crystal display 20 are supported on the supporting plate 40.

In order to protect the first liquid crystal display 10 and the second liquid crystal display 20, the multi-screen display device according to the first embodiment of the present invention also comprises a protective case 50, wherein the protective case 50 is fixedly disposed on the top of the first liquid crystal display 10 and the second liquid crystal display 20. Specifically, the protective case 50 comprises a case 51 and hooks 52 which are respectively disposed on both sides of the case, the case is opposite to the first liquid crystal display 10 and the second liquid crystal display 20, the frames 12 (namely, the frame 12 on the left side of the first first liquid crystal display 10 and the frame 12 on the right side of the second first liquid crystal display) on both sides of the multi-screen display device according to the first embodiment of the present invention are provided with slots 122, the hook 52 is engaged and connected with the corresponding slot 122 in order to fix the protective case. However, the disposed protective case 50 also can compensate the parallax which caused by the different plane of the first liquid crystal display 10 and the second liquid crystal display 20 through the variation of its optical refractive index.

Furthermore, in the first embodiment of the present invention, the material of the protective case 50 is transparent glass, but the present invention is not only limited in this, it could be other proper transparent material, such as transparent resin, and so on.

Figure 3:
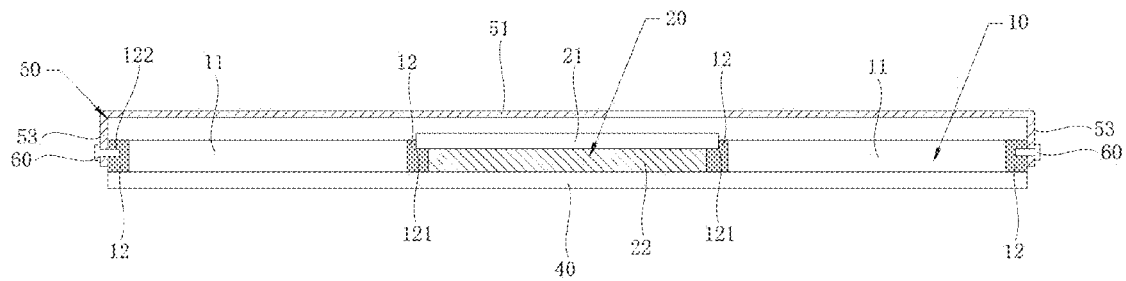
FIG. 3 is a structure diagram of a multi-screen display device according to the second embodiment of the present invention.

FIG. 3 is a structure diagram of a multi-screen display device according to the second embodiment of the present invention.

Refer to FIG. 3, the multi-screen display device according to the second embodiment of the present invention respectively comprises two first liquid crystal display 10 and a second liquid crystal display 20 which are placed on the different plane. It should be realized that the quantity of the first liquid crystal display 10 and the quantity of the second liquid crystal display 20 in the present invention are not limited as shown in FIG. 1, those could be any number.

Each first liquid crystal display 10 comprises a display region 11 and frames 12 provided on both side of the display region 11, three first liquid crystal display 10 are arranged at intervals, the second liquid crystal display 20 is disposed on the frames 12 of two first liquid crystal displays 10. So that the second liquid crystal display 20 uses the frames 12 of two first liquid crystal display as its own use, thus between the display region (not shown) of the second liquid crystal display 20 and the adjacent first liquid crystal display only has the width of a frame 12, comparing to the interval width A+2B between two adjacent independent liquid crystal displays in the prior art as shown in FIG. 1, greatly decreasing the display gap between two adjacent liquid crystal display, improving the display area and the display effect, enhancing the end user's viewing experience.

Specifically, the second liquid crystal display 20 comprises a correspondingly disposed liquid crystal display panel 21 and a backlight module 22, wherein the liquid crystal display panel 21 is disposed on the frame 12 of two first liquid crystal displays 10, the backlight module 22 is disposed between two first liquid crystal displays 10.

In order to fixedly mount the liquid crystal display panel 21 of the second liquid crystal display 20, the frame 12 of the first liquid crystal display 10 where is mounted the liquid crystal display panel 21 is disposed a mounting groove 121, the liquid crystal display panel 21 is fixedly mounted in the mounting groove 12. In the first embodiment of the present invention, preferably, the liquid crystal display panel 21 is permanently installed on the mounting groove 121 by using double-sided adhesive, but the present invention is not limited in this, there is the other way to be permanently installed on the mounting groove 121.

In order to support the first liquid crystal display 10 and the second liquid crystal display 20, the multi-screen display device according to the second embodiment of the present invention also comprises a supporting plate 40, wherein the supporting plate 40 is disposed under the first liquid crystal display 10 and the second liquid crystal display 20; namely, the backlight modules 22 of the first liquid crystal display 10 and the second liquid crystal display 20 are supported on the supporting plate 40.

In order to protect the first liquid crystal display 10 and the second liquid crystal display 20, the multi-screen display device according to the second embodiment of the present invention also comprises a protective case 50, wherein the protective case 50 is fixedly disposed on the top of the first liquid crystal display 10 and the second liquid crystal display 20. Specifically, the protective case 50 comprises a case 51 and connective bodies 53 which are respectively disposed on both sides of the case, the case 51 is opposite to the first liquid crystal display 10 and the second liquid crystal display 20, the connective body 53 is fixedly connected with the according frames 12 (namely, the frame 12 on the left side of the first first liquid crystal display 10 and the frame 12 on the right side of the second first liquid crystal display) of the multi-screen display device, namely, there is a screw via hole (not shown) on the connective body 53, and there is a screw blind hole (not shown) on the frame 12 of the corresponding multi-screen display device, using the screw 60 crossing the screw via hole to lock with the screw blind hole. However, the disposed protective case 50 also can compensate the parallax which caused by the different plane of the first liquid crystal display 10 and the second liquid crystal display 20 through the variation of its optical refractive index.

Furthermore, in the second embodiment of the present invention, the material of the protective case 50 is transparent glass, but the present invention is not only limited in this, it could be other proper transparent material, such as transparent resin, and so on.

Although the description of the present invention has been already referred to the particular embodiments, for those ordinary technical personnel in this art, it also can be improved and modified under the circumstance of without disobeying the present application principle.

What is claimed is:

1. A multi-screen display device, wherein it comprises a plurality of first liquid crystal displays and a plurality of second liquid crystal displays, wherein each of said first liquid crystal displays is arranged in space of a liquid crystal display, said second liquid crystal display is provided in the interval between two corresponding and adjacent first liquid crystal displays, wherein said second liquid crystal display is disposed on the frame of adjacent first liquid crystal displays.

2. The multi-screen display device as claimed in claim 1, wherein the second liquid crystal display comprises a correspondingly disposed liquid crystal display panel and a backlight module, wherein the liquid crystal display panel is disposed on the frame of two corresponding and adjacent first liquid crystal displays, the backlight module is disposed between two corresponding and adjacent first liquid crystal displays.

3. The multi-screen display device as claimed in claim 2, wherein the frame of two corresponding and adjacent first liquid crystal display is provided with a mounting groove, the liquid crystal display panel is permanently installed on the mounting groove.

4. The multi-screen display device as claimed in claim 3, wherein the liquid crystal display panel is permanently installed on the mounting groove through the pasting way.

5. The multi-screen display device as claimed in claim 4, wherein the liquid crystal display panel is permanently installed on the mounting groove by using double-sided adhesive.

6. The multi-screen display device as claimed in claim 2, wherein the multi-screen display panel also comprises a supporting plate which is disposed under the first liquid crystal display and the second liquid crystal display, it is used to support the first liquid crystal display and the backlight module.

7. The multi-screen display device as claimed in claim 2, wherein the multi-screen display device also comprises a protective case which is disposed on the top of the first liquid crystal display and the second liquid crystal display.

8. The multi-screen display device as claimed in claim 6, wherein the multi-screen display device also comprises a protective case which is disposed on the top of the first liquid crystal display and the second liquid crystal display.

9. The multi-screen display device as claimed in claim 7, wherein the protective case comprises a case and hooks which are respectively disposed on both sides of the case, the case being opposite to the first liquid crystal display and the second liquid crystal display, the frames on both sides of the multi-screen display device being provided with slots, the hook being engaged and connected with the corresponding slot in order to fix the protective case.

10. The multi-screen display device as claimed in claim 8, wherein the protective case comprises a case and hooks which are respectively disposed on both sides of the case, the case being opposite to the first liquid crystal display and the second liquid crystal display, the frames on both sides of the multi-screen display device being provided with slots, the hook being engaged and connected with the corresponding slot in order to fix the protective case.

11. The multi-screen display device as claimed in claim 7, wherein the protective case comprises a case and connected bodies which are respectively disposed on both sides of the case, the connected body being fixedly connected with the frame of the multi-screen display device through the screw hole counterpoint.

12. The multi-screen display device as claimed in claim 8, wherein the protective case comprises a case and connected bodies which are respectively disposed on both sides of the case, the connected body being fixedly connected with the frame of the multi-screen display device through the screw hole counterpoint.

13. The multi-screen display device as claimed in claim 7, wherein the material of the protective case is transparent glass.

14. The multi-screen display device as claimed in claim 8, wherein the material of the protective case is transparent glass.

* * * * *